Figure 1:
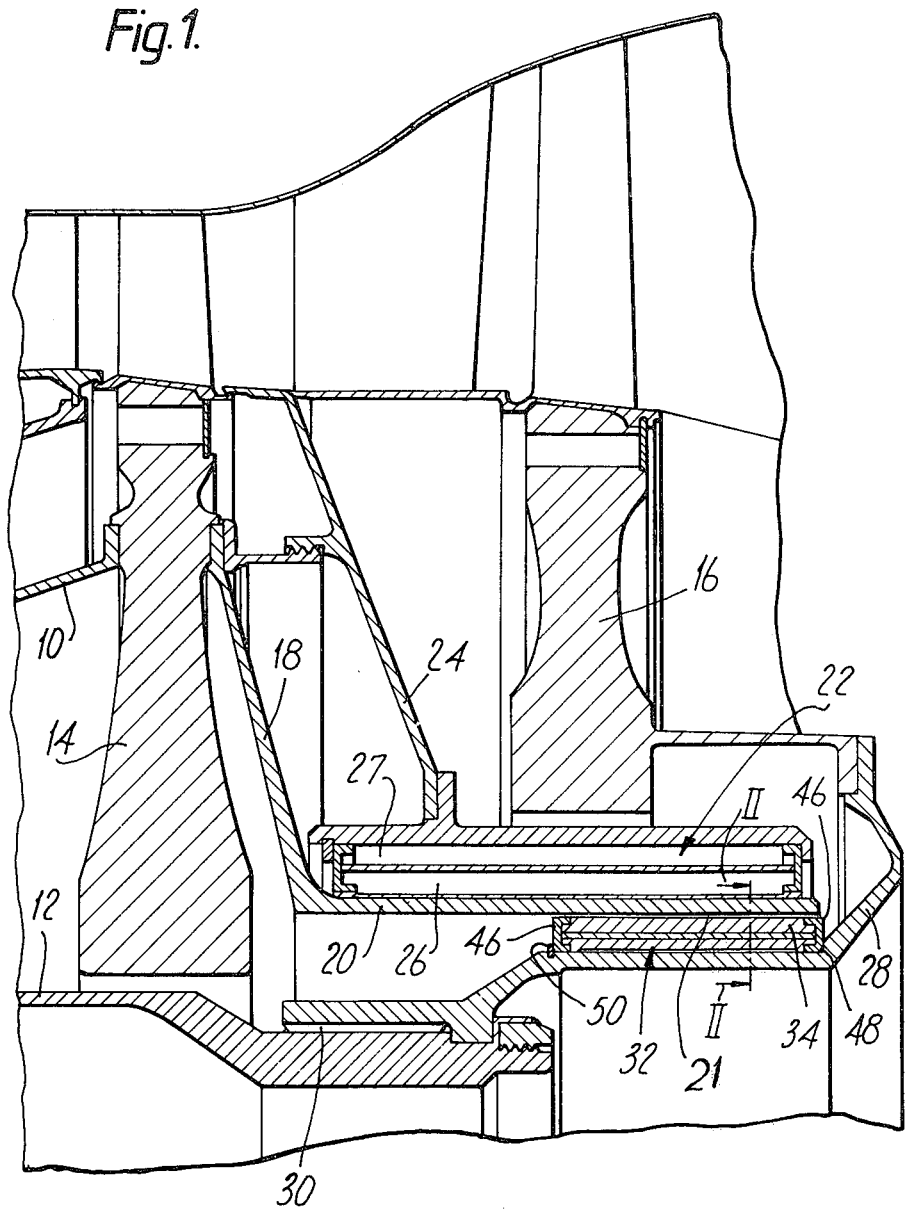

United States Patent [19]

Sargent et al.

[11] 4,332,427
[45] Jun. 1, 1982

[54] AIR BEARING FOR USE WITH CONCENTRIC ROTARY SHAFTS IN MACHINES

[75] Inventors: Raymond F. Sargent; John M. Hall, both of Bristol, England

[73] Assignee: Rolls-Royce Limited, London, England

[21] Appl. No.: 167,732

[22] Filed: Jul. 14, 1980

[30] Foreign Application Priority Data

Aug. 4, 1979 [GB] United Kingdom ................ 7927265

[51] Int. Cl.³ ............................................. F16C 32/06
[52] U.S. Cl. ...................................... 308/9; 308/160; 308/DIG. 1
[58] Field of Search ................ 308/9, 15, 26, 73, 121, 308/160, DIG. 1

[56] References Cited
U.S. PATENT DOCUMENTS 4,118,079 10/1978 Newman et al. ...................... 308/9

Primary Examiner—Frederick R. Schmidt
Attorney, Agent, or Firm—Stevens, Davis, Miller & Mosher

[57] ABSTRACT

U.S. Pat. No. 4,118,079 discloses a fluid bearing in which resilient shells are bent during operation of the bearing in response to changes in pressure of the fluid to make them conform more closely to the confronting surface defining the fluid gap. In the present invention a bearing of this type is used as an intershaft bearing by mounting the shells on one of the rotating shafts the problems associated with centrifugal forces on the shells being turned to advantage by mounting the shells on an external surface of one of the shafts to confront an internal surface on the other shaft. In an application of the invention to a gas turbine engine the two shafts are the high pressure shaft 10 and the concentric inner low pressure shaft 12. The bearing shells 34 of the air bearing 32 are mounted on resilient spring levers 36 on the slower low pressure shaft 12 and their convex surfaces confront the concave internal surface of the high pressure shaft 10, to define the air gap. The spring levers together with the centrifugal forces on the shells modify the shapes of the shells in response to air pressure in the gap to improve the load carrying capacity of the bearing. The shafts contra rotate to maximize relative rotational speed of the surfaces.

7 Claims, 2 Drawing Figures

AIR BEARING FOR USE WITH CONCENTRIC ROTARY SHAFTS IN MACHINES

DESCRIPTION

The present invention relates to fluid bearings of the type described in U.S. Pat. No. 4,118,079 and to their use in engines or other machines having multiple shafts.

In. U.S. Pat. No. 4,118,079 there is described a fluid bearing in which relatively stiff shells, as distinct from flexible foils as used in foil gas bearings, are mounted on a housing surrounding a shaft and are acted upon during operation by reaction members to bend them into greater conformity with the shaft surface to modify the thickness of a fluid film between the shells and the shaft to improve the load-carrying capacity of the bearing.

Such bearings can in general, replace a conventional roller bearing without significant modification by mounting the shells within the fixed bearing housing of a conventional bearing to replace the rollers. However, some machines, e.g. gas turbine engines employ concentric shafts rotating relative to each other which produces problems with the introduction of air bearings of the above described type.

For example, when a two-shaft gas turbine engine is started, the starter motor conventionally turns only the high pressure shaft, on which are mounted the high pressure compressor and turbine. The low pressure turbine begins to turn only when sufficient aerodynamic torque has been developed in it to overcome friction in the rotating parts, including the bearings. When, however, an air bearing earthed to static structure is used to support the low pressure shaft, the shells and the shaft are in contact and significantly greater starting torque is required to turn the shaft. Also since the low pressure shaft together with its compressor and turbine forms a heavier system than the high pressure system, the turbine tends to accelerate more slowly and significant rubbing can take place before sufficient speed is built up to enable the shaft to lift off the shells.

Another problem which arises if the shells are mounted on one of the shafts instead of being "earthed" to a housing on static structure, is the effect of centrifugal forces on the shells which would tend to alter the curvature of the shells.

The effects of these problems are reduced to a great extent in the present invention by the particular arrangement of the parts of a bearing of the type described in the above-mentioned patent application with the rotating shafts of a two-shaft machine.

According to the present invention a machine having first and second concentric rotating shafts includes a fluid bearing comprising a plurality of resilient shells mounted on one of the shafts for rotation therewith and defining a plurality of surfaces confronting the other one of the shafts and spaced therefrom to define a tapering gap in which, in operation, a fluid film is formed, each of the resilient shells being of a thickness which, relative to its other dimensions is such as to prevent the shell from locally deflecting at unsupported positions in response to increases in the pressure of said fluid film, and load reacting members being mounted between each of the shells and the shaft on which they are mounted to provide, in response to increases in pressure in the fluid film, reaction loads at two locations on a shell on opposite sides of the resultant of the pressure in said film to bend each of the shells in the manner of a stiff beam to modify the shapes of the shells so that the bearing surfaces on the shells conform more closely to the surface of the shaft which they confront in the regions of minimum fluid film thickness, and wherein the shells are mounted on a portion of said one of the shafts which lies radially inwardly of said other one of the shafts and the bearing surfaces of the shells are formed on convex surfaces thereof to confront the internal surface of said other one of the two shafts.

By this means, the centrifugal forces on the shells urge the shells towards contact with said other one of the shafts and assist in the control of the size of the fluid film thus containing the centrifugal load by creating a reaction pressure in the fluid film. The two forces in the bearing thus created by the rotation of the shafts can be made to some extent to be self-compensating since the greater the rotational speed of the shaft the greater the centrifugal loads, but at the same time the greater the relative rotational speed between the shafts the greater the fluid pressure and thus the reaction pressure.

In general, in a gas turbine engine the low pressure shaft will be the radially inner shaft. Thus the starting problem referred to above will be eased, if not eliminated, by this arrangement, because the shells will be pre-loaded onto the high pressure shaft, and when that shaft has been driven up to sufficient speed by the starter motor the shells will lift off the high pressure shaft allowing the low pressure shaft to rotate with no rubbing friction in the bearing at all.

Further beneficial design features can be included in the arrangement to gain further advantages. Thus the two shafts may be made to be contra-rotating, to give a significantly higher relative rotational speed between the shells and the shaft surface which they confront. By this means higher fluid pressures can be achieved in the fluid film giving greater load carrying capacity or a smaller bearing for the same load, and greater control can be achieved over the centrifugal loads.

A further preferred feature is that the shells are mounted on the shaft which has the lower speed of rotation to minimise the centrifugal effects on the shells so that they do not overcome the pressure forces in the fluid film and cause contact during running.

Although excessive centrifugal forces on the shells would be detrimental to the bearing operation, the introduction of the centrifugal forces into the bearing arrangement by mounting the bearing on a rotating shaft does give another variable which can be adjusted to optimise the design. Thus, the position of the centre of gravity of the shells may be varied for any given design e.g. by tapering the shells.

The high pressure shaft may in addition be supported from a second air bearing earthed to static structure, and the two bearings may be disposed concentrically at the same axial location, or may be axially spaced to allow variation of the diameter of the shaft between the bearings so as to optimise the load carrying capacity, or other features of the bearing design.

Figure 2:
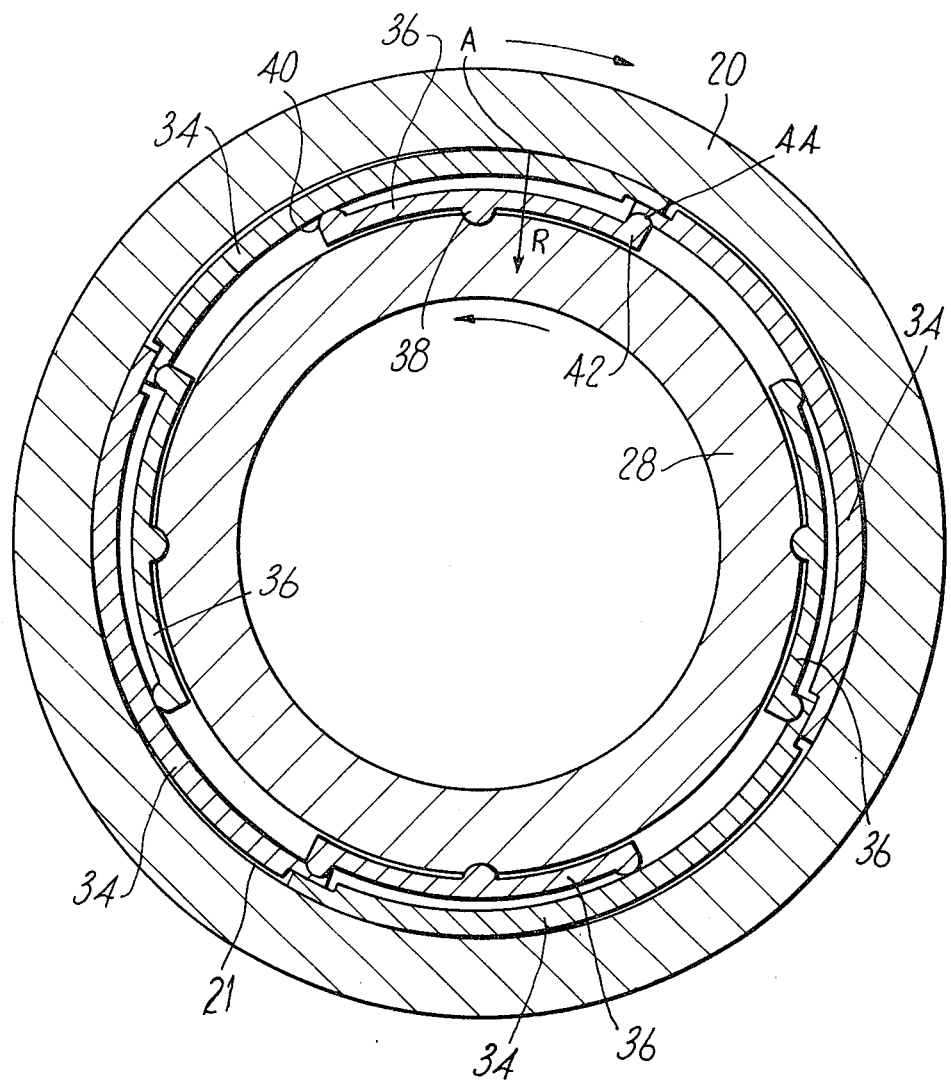

The invention will now be more particularly described by way of example only, with reference to the accompanying drawings in which:

FIG. 1 is a sectional elevation through the turbine section of a gas turbine engine; and, FIG. 2 is an enlarged cross section on the line II—II of FIG. 1 illustrating the radially inner bearing only.

Referring now to the drawings, the gas turbine engine has two contra-rotating shafts 10,12 one of which 10 drivingly interconnects a single stage high pressure turbine 14 with a high pressure compressor (not shown), and the other of which 12 drivingly interconnects a single stage low pressure turbine 16 with a low pressure compressor or fan (not shown). Part of the shaft 10 is formed by a cone 18 connected to the downstream side of the high pressure turbine and which terminates in a cylindrical extension 20. The shaft 10 is supported for rotation by an air bearing 22 mounted on static structure 24 and surrounding the extension 20 of the shaft 10. The air bearing 22 is of the type described in our co-pending patent application No. 24451/76 and is not therefore described in detail other than to state that it has shells 26 which have bearing surfaces formed on their concave sides and which confront the convex surface of the shaft extension 20 to define tapering gaps for the formation of a supporting air film, and resilient levers 27 for controlling the shapes of the shells.

The shaft 12 has an extension 28 connected thereto by means of a splined coupling 30 and carries a second air bearing 32 which is disposed within the shaft extension 20. The air bearing 32 operates in principle in the same manner as the air bearing 22 except in that it has shells 34 which have bearing surfaces formed on their convex sides to confront the radially inner surface of the shaft extension 20 to define an air gap 21.

FIG. 2 illustrates the detail of the bearing 32 wherein it can be seen that the shells 34 lie in between the shaft extensions 20 and 28 and are carried on resilient spring levers 36 which are in turn mounted on the shaft extension 28 and are provided with axially extending ribs 38 which engage the shaft extension 28 so that the spring levers rotate with the shaft extension 28. The ribs 38 each act as a fulcrum for the respective spring levers and the lever arms on either side of the fulcrum terminate in further ribs 40,42 which contact the underside of adjacent shells 34. The ribs 40 and 42 are positioned on opposite sides of the resultant of the fluid pressure force R which acts radially inwardly through point A, and provide outward reaction loads to bend the shells in a manner which causes them to conform in shape more closely to the shape of the internal surface of the shaft extension 20, to modify the profile of the gap 21 to increase the load carrying capacity as explained in the specification to U.S. Pat. No. 4,118,079.

The shells have to be prevented from rotation relative to the spring levers 36 and one convenient method of achieving this is to form depressions 44 in the concave sides of the shells at the points where the ribs 42 are to contact the shells so that the ribs locate the spring levers and shells against rotation. Clearly other means of achieving this location can be used, for example, tabs provided on the axial ends of the spring levers which can be bent during assembly into appropriate slots in the shells. The spring levers and shells are located axially relative to each other by end caps 46 and are located axially in position on the shaft extension 28 between an abutment face 48 on the shaft extension and a retaining circlip 50.

Significant operational advantages can be gained from the above described arrangement over an arrangement in which the bearings for the two shafts are "earthed" to static structure. By making use of the relative speed of rotation between the two shafts, a sufficiently high relative rotational speed can be achieved even though the shafts may be rotating in the same direction, particularly if the radially outer high pressure shaft is rotating at very high speed. Since the pressure in the air film in the gap depends, inter alia, on the relative rotational speed between the surfaces defining the gap, the higher this relative rotational speed can be made the smaller the bearing can be made for a given load-carrying capacity. Clearly if the shafts are made contra-rotating the relative rotational speed can be increased still further.

By arranging the shafts so that the one on which the bearing is to be mounted has a portion which lies radially inwardly of the other shaft, and by arranging that the confronting bearing surfaces defining the gap are on the convex surfaces of the shells and on a concave surface of the other shaft arranged to surround the shells, the effects of the centrifugal loads on the shells are automatically compensated. The shells are mounted on the shaft having the lower rotational speed to avoid the possibility that the centrifugal loads on the shells overcome the air pressure loads and cause rubbing contact. It may be possible however, if required, with contra-rotating shafts providing sufficient relative rotational speed, to arrange that the shaft having the higher rotational speed has a portion lying radially within the other shaft so that the shells could be mounted on the faster of the two shafts.

The invention has been described with reference to an embodiment having two air bearings in the same axial location. Other arrangements are clearly possible however in that the "earthed" bearing could be a conventional ball or roller bearing, and the two bearings could be axially separated to allow the shaft diameter to be changed in between the two bearings to optimise the bearing designs to give maximum load carrying capacity for minimum size.

In the twin air bearing arrangement described above both sets of shells are arranged to confront a portion of the high pressure shaft. Thus on starting the engine, once the starter motor has driven the high pressure shaft up to sufficient speed, both sets of bearing shells lift off and the low pressure shaft can accelerate more freely. This can be a significant advantage if it is required to drive auxiliary services from the low pressure shaft.

We claim:

1. A machine having first and second concentric rotating shafts and including a fluid bearing comprising a plurality of resilient shells mounted on one of the shafts for rotation therewith and defining a plurality of surfaces confronting the other one of the shafts and spaced therefrom to define a tapering gap in which, in operation, a fluid film is formed, each of the resilient shells being of a thickness which, relative to its other dimensions is such as to prevent the shell from locally deflecting at unsupported positions in response to increases in the pressure of said fluid film, and load reacting members being mounted between each of the shells and the shaft on which they are mounted to provide, in response to increases in pressure in the fluid film, reaction loads at two locations on a shell on opposite sides of the resultant of the pressure in said film to bend each of the shells in the manner of a stiff beam to modify the shapes of the shells so that the bearing surfaces on the shells conform more closely to the surface of the shaft which they confront in the regions of minimum fluid film thickness, and wherein the shells are mounted on a portion of said one of the shafts which lies radially inwardly of said other one of the shafts and the bearing surfaces of the shells are formed on convex surfaces thereof to confront the internal surface of said other one of the two shafts.

2. A machine as claimed in claim 1 and in which the first and second shafts rotate in opposite directions.

3. A machine as claimed in claim 1 and in which the air bearing is mounted on a portion of the shaft having the lower speed of rotation.

4. A machine as claimed in claim 1 and in which the other one of the shafts is supported for rotation in a second air bearing mounted on fixed structure.

5. A machine as claimed in claim 1 and comprising a gas turbine engine having concentric low pressure and high high pressure shafts.

6. A gas turbine engine as claimed in claim 5 and in which the low pressure and high pressure shafts rotate in opposite directions, the air bearing being mounted on a portion of the low pressure shaft which rotates at a lesser speed than the high pressure shaft and having shells which confront the internal surface of a portion of the high pressure shaft, and wherein the high pressure shaft is itself supported from a second air bearing having shells mounted on fixed structure and confronting the external surface of a portion of the high pressure shaft.

7. A gas turbine engine as claimed in claim 6 and in which the two air bearings are in the same axial location and confront internal and external surfaces of the same portion of the high pressure shaft.

* * * * *